United States Patent [19]
Isley

[11] Patent Number: 6,062,793
[45] Date of Patent: May 16, 2000

[54] APPARATUS FOR RETRACTING AND EXTENDING A BOOM

[75] Inventor: Reggald Emory Isley, Grande Prairie, Canada

[73] Assignee: Risley Enterprises Ltd., Grand Prairie, Canada

[21] Appl. No.: 08/939,301

[22] Filed: Sep. 29, 1997

[51] Int. Cl.⁷ .................................................. A01G 23/08
[52] U.S. Cl. ...................... 414/23; 144/250.21; 212/231; 212/264; 74/89.2
[58] Field of Search .............................. 414/23; 212/230, 212/231, 264, 348; 198/371.2, 750.1, 861.1; 144/24.13, 245.6, 250.21; 74/89.22, 89.21, 89.2

[56] References Cited

U.S. PATENT DOCUMENTS

| Re. 30,021 | 6/1979 | Olson et al. | 212/231 |
|---|---|---|---|
| 769,947 | 9/1904 | Kramer | 198/371.2 |
| 4,289,177 | 9/1981 | Hammond et al. | 144/24.13 |
| 4,413,661 | 11/1983 | Marchildon | 144/24.13 |
| 4,428,407 | 1/1984 | Bourbeau | 144/24.13 |
| 4,919,175 | 4/1990 | Samson | 144/24.13 |
| 5,568,829 | 10/1996 | Crawford et al. | 144/24.13 |
| 5,865,229 | 2/1999 | Unosen | 144/24.13 |

*Primary Examiner*—Douglas Hess
*Attorney, Agent, or Firm*—Oyen Wiggs Green & Mutala

[57] ABSTRACT

The invention provides a drive system for extending or retracting a boom. The boom comprises an elongated boom slidably mounted to a vehicle. The drive system comprises: a flat belt extending generally parallel to the boom; a rotatable drum mounted to the vehicle; and a pair of spaced apart rollers adjacent the rotatable drum. The belt is attached to the boom by couplings at either end of the belt. A loop of the belt extends through a gap between the pair of spaced apart rollers and around an outer circumference of the rotatable drum. The gap has a width less than a diameter of the rotatable drum. The drive system can be used to advantage in a forestry machine such as a tree delimber.

27 Claims, 7 Drawing Sheets

APPARATUS FOR RETRACTING AND EXTENDING A BOOM

FIELD OF THE INVENTION

This invention relates to apparatus for extending and retracting the boom in a boomed vehicle. The apparatus has particular application to booms on forestry equipment, such as stroke type tree delimbers. Apparatus according to the invention is well adapted for use in conjunction with a cable-stayed boom.

BACKGROUND OF THE INVENTION

Many types of heavy equipment have a boom which can be extended or retracted. For example, the LIM-MIT™ stroke tree delimbing machines manufactured by Risley Equipment Ltd. of Grande Prairie, Alberta, Canada have a pair of delimbing knives mounted at the end of a boom. The operator of the machine can pick up a felled tree with the delimbing knives, and hold one end of the felled tree between feed rolls on the machine. The operator can then extend or retract the boom to sweep the delimbing knives along the felled tree, thereby removing branches from the felled tree. Maintaining high levels of production with a delimber of this type requires that the boom be capable of being extended or retracted very quickly. Typical boom speeds are in the range of 10 to 20 feet per second.

In smaller delimbers having short booms it can be practical to operate the boom with a telescoping hydraulic piston. This becomes impractical as the stroke of the boom gets longer. Larger delimbers may typically require the boom to have a stroke of approximately 30 feet, or more.

In modem larger delimbers the boom is typically driven by means of a drum mounted to the machine above the boom. A length of cable extends from each end of the boom to the drum. The inner end of each length of cable wraps around, and is attached to the drum. The outer ends of the lengths of cable are attached to the front and rear ends of the boom respectively. The drum is grooved to guide the cable onto the drum. The boom can be extended or retracted by rotating the drum in one direction or the other.

A problem with cable driven booms is that the cables are expensive and can wear out very quickly. The cables are subjected to extreme tension which varies very rapidly when the boom is being accelerated. The cables can begin to unwind each time tension is applied. This accelerates wear on the cables. A further problem with a cable drive is that the cables are not always collinear with the boom because the lateral positions of the points at which the cables wrap onto the drum vary as the cables wind onto and off of the drum. When the cables are not always perpendicular to the axis of the drum they wear, and the drum wears, faster than is desirable. The drum is expensive because its surface must be grooved to receive the cable. A cable drive is also noisy and transmits shock to the machine itself when the boom is suddenly stopped.

SUMMARY OF THE INVENTION

This invention provides an extendible boom assembly. The boom assembly comprises an elongated boom member slidably connected to a frame; a flat belt extending along the boom member and connected to the boom member at either end; and, drive means on the frame and frictionally engaging the belt. Operating the drive means to move the belt in a first direction extends the boom member and operating the drive means to move the belt in a second direction opposite to the first direction retracts the boom member. A boom assembly according to the invention can be used to advantage on boomed forestry machinery.

The drive means preferably comprises a rotatable drive drum and means for rotating the drive drum about an axis of the drive drum. The belt frictionally contacts the drive drum in a contact area extending around a generally cylindrical outer surface of the drive drum. Preferably the contact area extends through an angle in excess of 180 degrees relative to the axis of the drive drum. Most preferably the drive means comprises a pair of spaced apart rollers floating adjacent the drive drum so that a loop of the belt extends between the rollers and frictionally engages an outer surface of the drive drum.

Another aspect of the invention provides a drive system for extending and retracting an elongated boom slidably mounted to a vehicle superstructure. The drive system comprises: a flat belt extending generally parallel to the boom, the belt having first and second ends coupled to the boom; a rotatable drum mounted to the vehicle superstructure; and a pair of spaced apart rollers adjacent the rotatable drum A loop of the belt extends through a gap between the pair of spaced apart rollers and around an outer circumference of the rotatable drum. The gap has a width less than a diameter of the rotatable drum. The spaced apart rollers are preferably free to float at least slightly relative to the drum.

In a preferred embodiment the belt is connected to the boom by a coupling comprising a hydraulic cylinder connected between a spreader on the belt and the boom. The hydraulic cylinder is connectable to a source of a pressurized hydraulic fluid to tension the belt. Most preferably the other end of the belt is coupled to the boom by a coupling comprising a transverse member mounted for rotation to the boom, connecting means for connecting an end of the belt to the transverse member, means for rotating the transverse member in a first sense, and locking means engageable to prevent the transverse member from rotating in a sense opposite to the first sense. Wherein the end of the belt can be secured by connecting the end of the belt to the transverse member and rotating the transverse member in the first sense to wind the belt around the transverse member. The connecting means may comprise a slot penetrating through the transverse member, the slot dimensioned to receive an end portion of the belt.

A further aspect of the invention provides a tree delimber comprising: an undercarriage; a superstructure mounted to the undercarriage; a boom slidably mounted to the superstructure; a drive means for the boom, a pair of delimbing knives mounted at a forward end of the boom; and tree holding means mounted to the superstructure for holding a tree while the delimbing knives are moved along the tree by the drive means. The drive means comprises: a flat belt extending generally parallel to the boom, the belt attached to the boom by couplings at either end thereof; a drum mounted to the superstructure and rotatable about an axis by a reversible drive; and a roller assembly comprising a pair of spaced apart rollers adjacent the drum. A loop of the belt extends through a gap between the pair of spaced apart rollers and around an outer surface of the rotatable drum.

BRIEF DESCRIPTION OF THE DRAWINGS

Embodiments of the invention shall now be described with reference to the following drawings, which should not be used to limit the scope of the invention in any way, in which.

DETAILED DESCRIPTION

Figure 1:
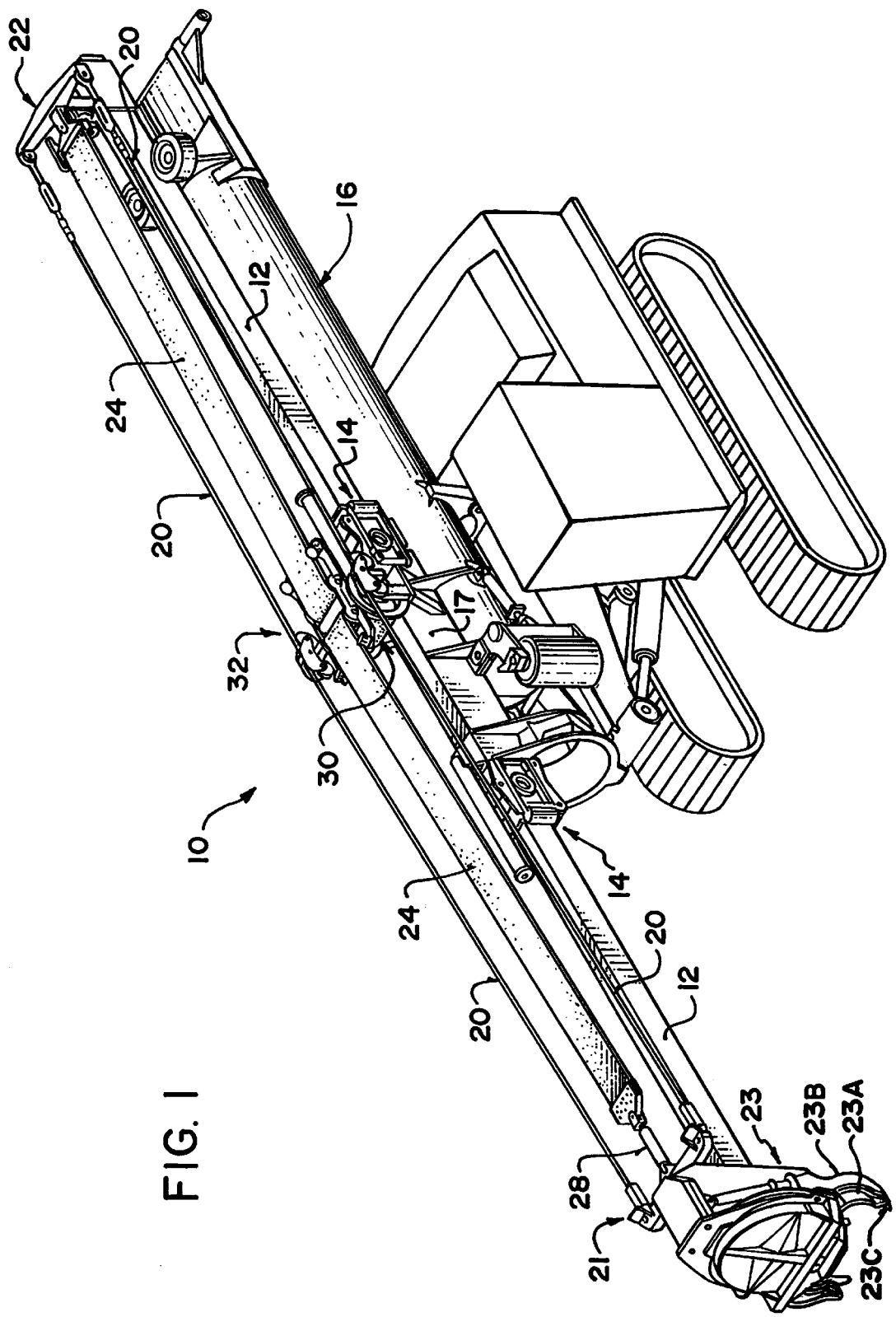
FIG. 1 is a perspective, partially schematic, view of a delimber having a boom driven by a boom drive system according to the invention.

As shown in FIG. 1, a machine 10 equipped to operate as a tree delimber has a boom 12. Boom 12 is slidably mounted through linear bearings 14 in a frame 17 which forms part of the superstructure 16 of machine 10. Boom 12 is stayed by cables 20 which are tensioned between supports 21, 22 at either end of boom 12.

A delimbing head 23 is mounted at the forward end of boom 12. Delimbing head 23 has delimbing knives 23A which comprise a pair of curved arms 23B having sharpened edges 23C. Arms 23B can be brought together to grasp the trunk of a felled tree and then swept along the trunk to remove branches from the felled tree. These aspects of machine 10 are known by those skilled in the art.

Boom 12 is extended and retracted by a driving system according to the invention. The driving system includes a flat belt 24. Belt 24 is preferably a fiber reinforced belt which, in a typical delimber application could be approximately 16 to 18 inches wide. Belt 24 may be, for example, a section of the 3 ply 16 inch wide conveyor belting material sold by Goodyear Tire & Rubber Company of Akron, Ohio, under the Part No. B600-30-16. This belting material has a 4 mm rubber coating on one face (upper face 37) and an abrasion resistant backing on its other face (lower face 38). Belt 24 is preferably maintained under significant tension.

Figure 4:
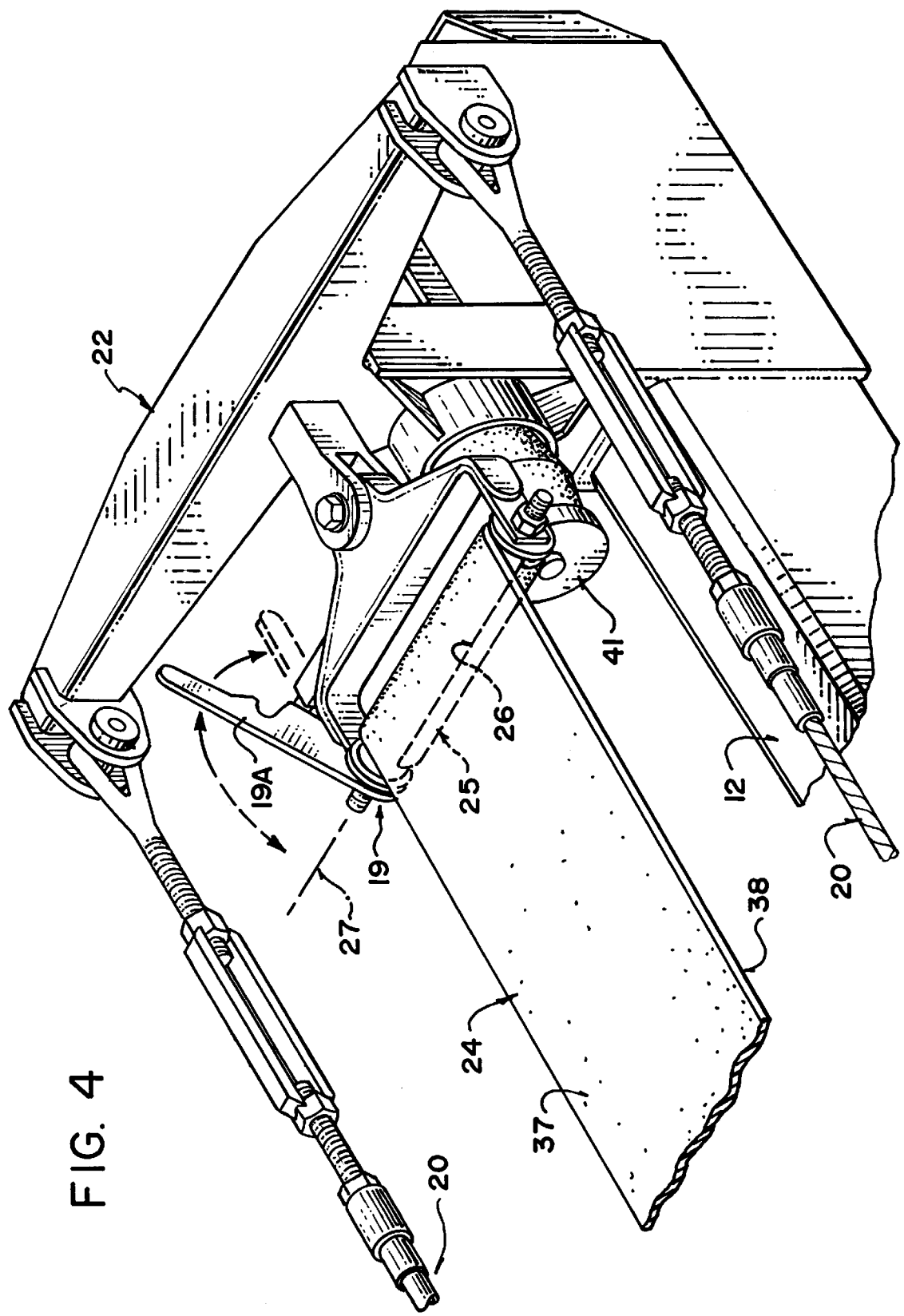
FIG. 4 is a detailed perspective view of a rear end portion thereof showing apparatus for anchoring a belt.

In a preferred embodiment, as shown in FIG. 4, the rearmost end of belt 24 is received through a slot 26 in a transverse shaft 25 which is mounted to rear cable support 22 on boom 12. Shaft 25 is rotatable about its longitudinal axis 27 which extends transversely to belt 24. The rearmost end of belt 24 can be affixed to rear cable support 22 by inserting the end of belt 24 in slot 26 and rotating shaft 25 about axis 27 in one direction until belt 24 is wrapped around shaft 25 enough to prevent belt 24 from slipping off of shaft 25 when belt 24 is under tension.

A locking means, which preferably comprises a ratchet mechanism 19 connected to shaft 25, prevents shaft 25 from rotating in the reverse direction. Ratchet mechanism 19 comprises an operating lever 19A which has a locked position wherein it is aligned with belt 24 as illustrated in dashed outline in FIG. 4. In the alternative, belt 24 may be affixed in any suitable manner to rear support 22. For example, a spreader bar on the rear end of belt 24 may be coupled to the rear end of boom 12 by any suitable means.

Figure 5:
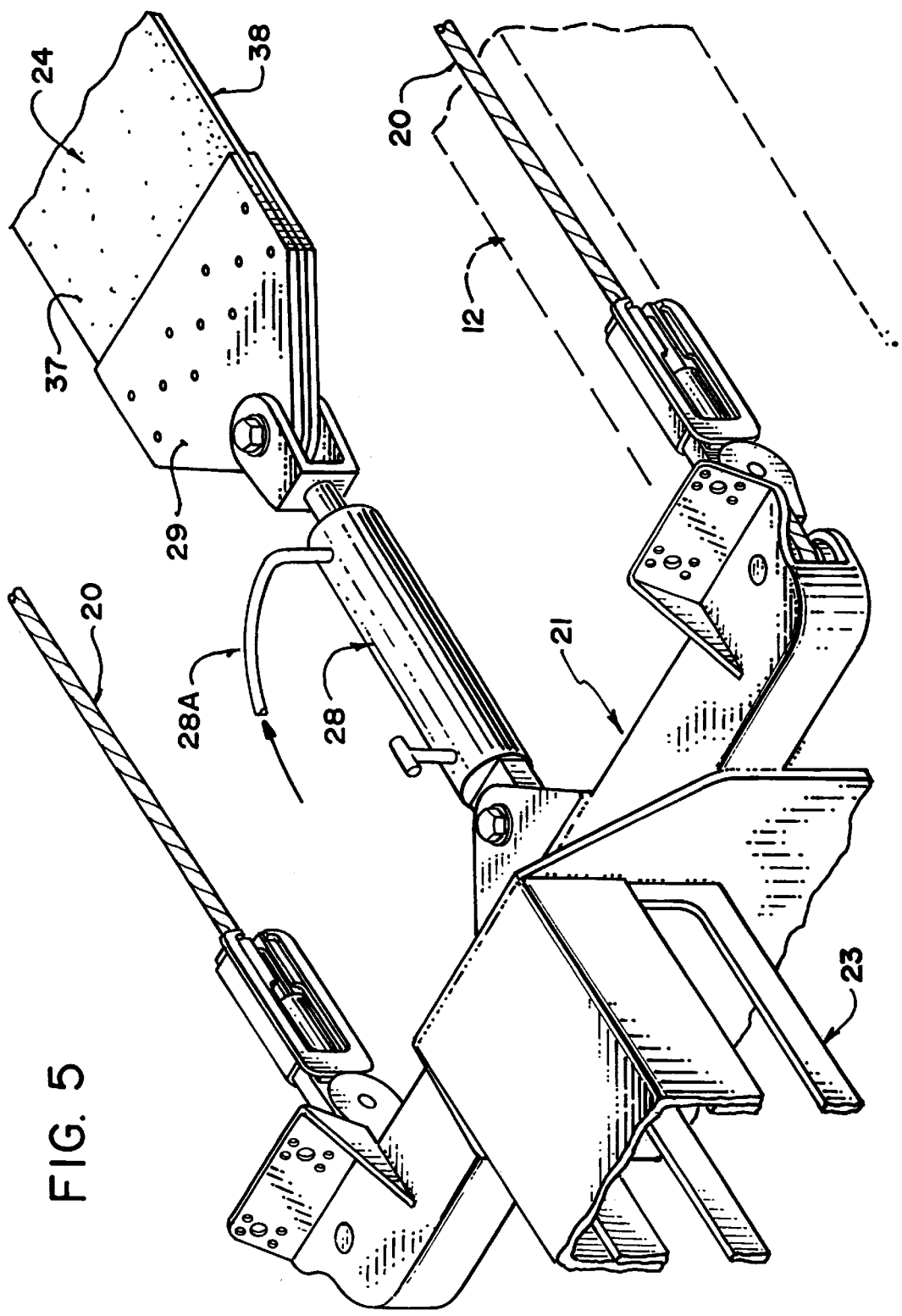
FIG. 5 is a detailed perspective view of a front end portion thereof including a hydraulic belt tensioning system.
Figure 6:
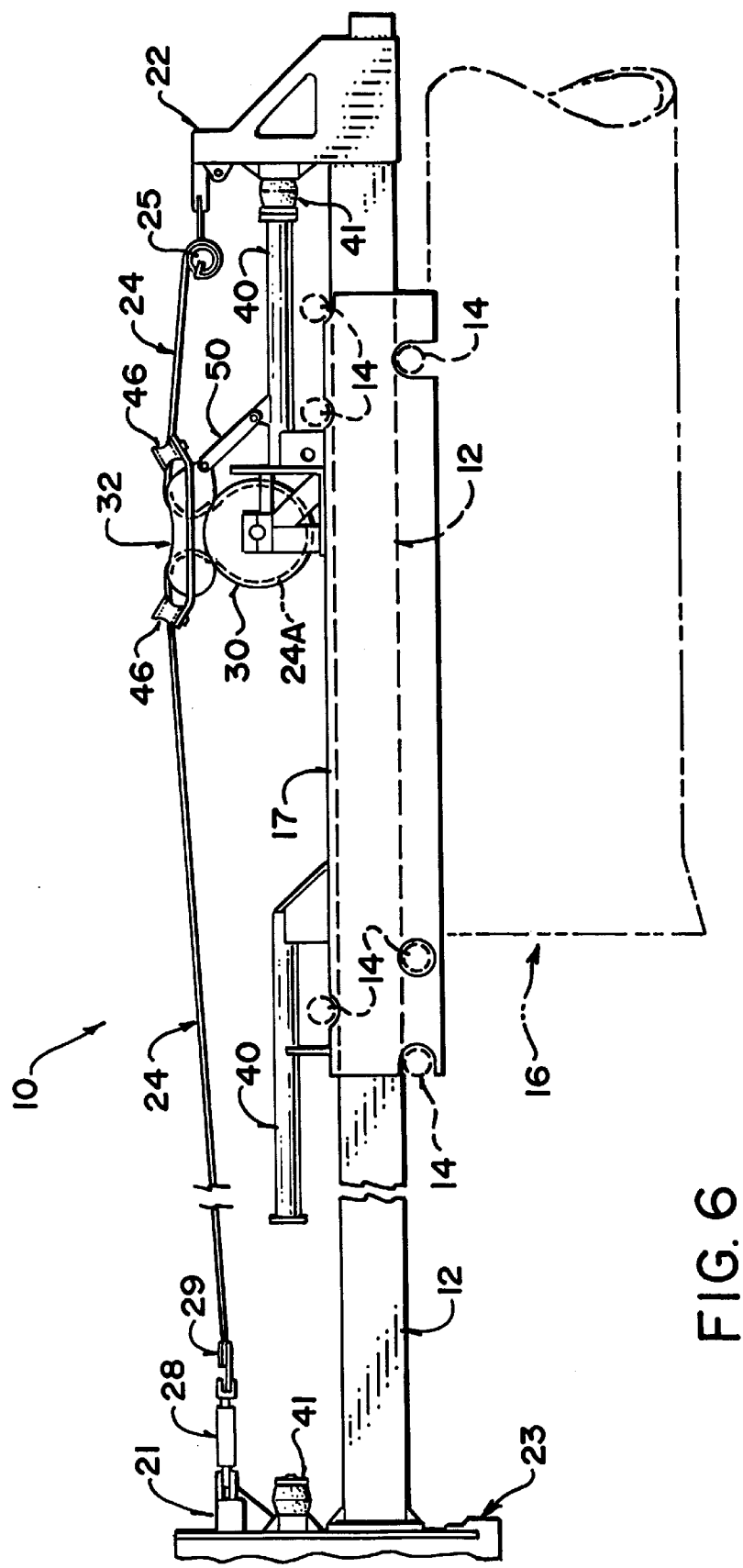
FIG. 6 is a side elevational view thereof with the boom in a fully extended position and with components removed for clarity; and, FIG. 7 is a schematic side elevational view of an alternative embodiment of the invention.

Preferably, as shown in FIG. 5, belt 24 is tensioned by a hydraulic cylinder 28 extending between a spreader bar 29 at the front end of belt 24 and a mounting point on front cable support 21 at the front end of boom 12. Hydraulic cylinder 28 may be connected to a hydraulic line 28A which contains pressurized hydraulic fluid whenever machine 10 is running so that belt 24 is tensioned whenever machine 10 is operating. Most delimbing machines have one or more hydraulic lines to supply fluid under pressure to head 23. Head 23 typically includes one or more hydraulically operated devices such as topping saws, delimbing knives, grapples, or the like. Hydraulic cylinder 28 is preferably capable of exerting a force on belt 24 on the order of approximately 10,000 pounds or more when the system of the invention is used on a delimbing machine as shown in FIG. 1.

Belt 24 passes over a drive drum 30 which is mounted to a frame 17 on superstructure 16 for rotation about a transverse axis 30A. Drum 30 typically has a diameter of approximately 20 inches and a width slightly greater than the width of belt 24. Drum 30 has a generally cylindrical outer surface 31 extending between a pair of flanges 33. A floating roller assembly 32 bearing idler rollers 34 lies adjacent drum 30. Idler rollers 34 are mounted in spaced relationship by side bracket plates 36 which lie on left and right sides of belt 24. A cross member 35 extends between bracket plates 36.

Figure 3:
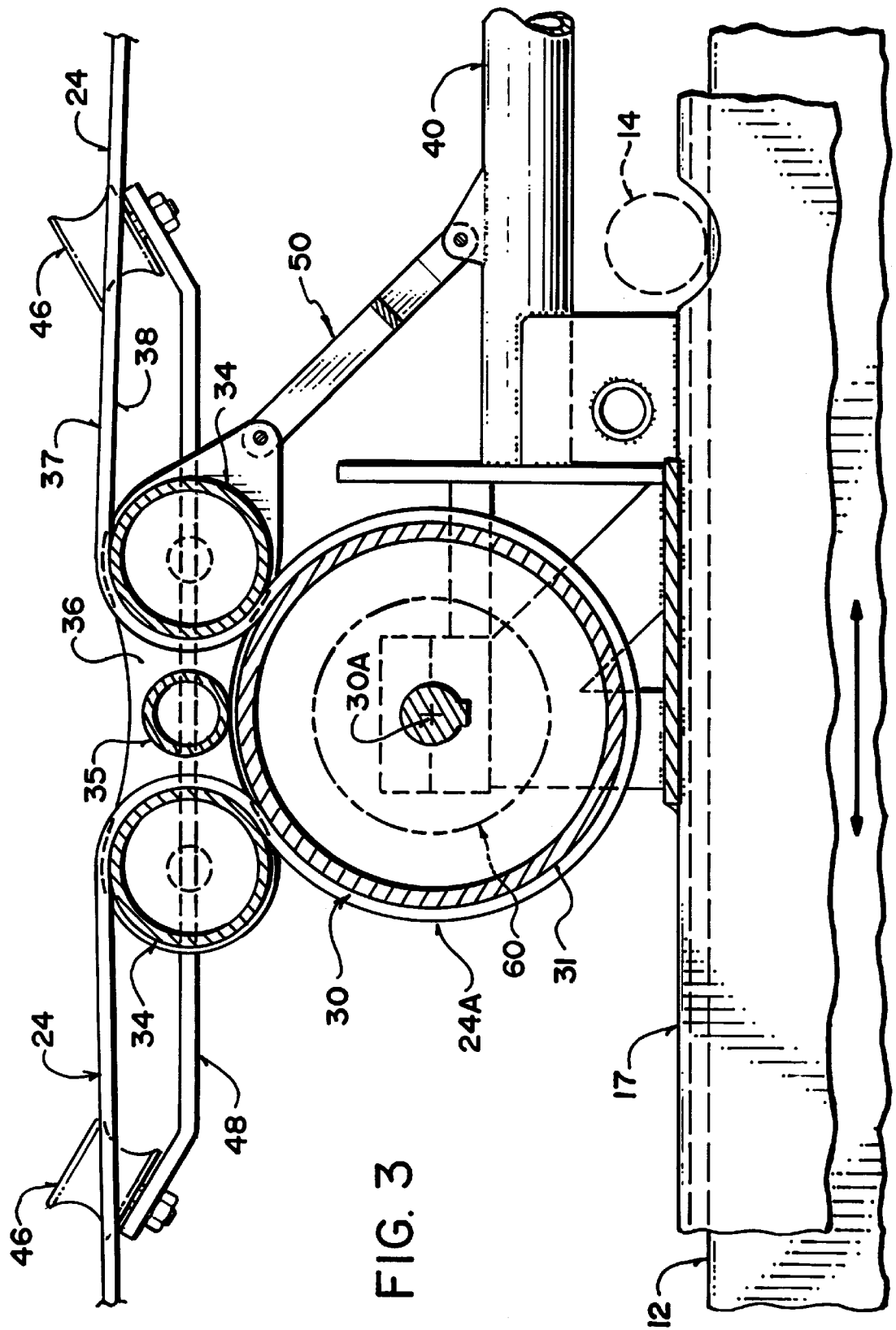
FIG. 3 is an enlarged longitudinal sectional view of the drive drum portion thereof with some components removed for clarity.

A loop 24A of belt 24 is formed by roller assembly 32 and drum 30. Loop 24A wraps partially around the outer surface of drum 30. The shape of loop 24A is determined by the spacing of rollers 34, the diameter of drum 30 and the thickness of belt 24, as is best shown in FIG. 3. Idler rollers 34 bear against lower face 38 of belt 24 and compress belt 24 against the outer surface of drum 30.

Idler rollers 34 are spaced apart by a distance smaller than the diameter of drum 30. For example, where drum 30 has an outer diameter of 20 inches, idler rollers 34 preferably have outside diameters of about 8 inches and have their axes spaced apart by a distance of approximately 16 inches. The gap between idler rollers 34 is then about 8 inches wide, which is less than the diameter of drum 30.

It can be appreciated that tension in belt 24 tends to pull idler rollers 34 apart and downwardly toward drum 30, thereby compressing belt 24 between idler rollers 34 and drum 30. The greater the tension on belt 24 the larger is the force between idler rollers 34 and drum 30. Applying sufficient tension to belt 24 ensures that the loop 24A of belt 24 which extends between idler rollers 34 and wraps around the generally cylindrical outer surface 31 of drum 30 will firmly engage drum 30. Preferably loop 24A contacts the outer surface 31 of drum 30 in a contact patch which extends the width of belt 24 through an angle in excess of 180 degrees. Preferably, a rubberized upper surface 37 of belt 24 bears against the outer surface of drum 30.

Figure 2:
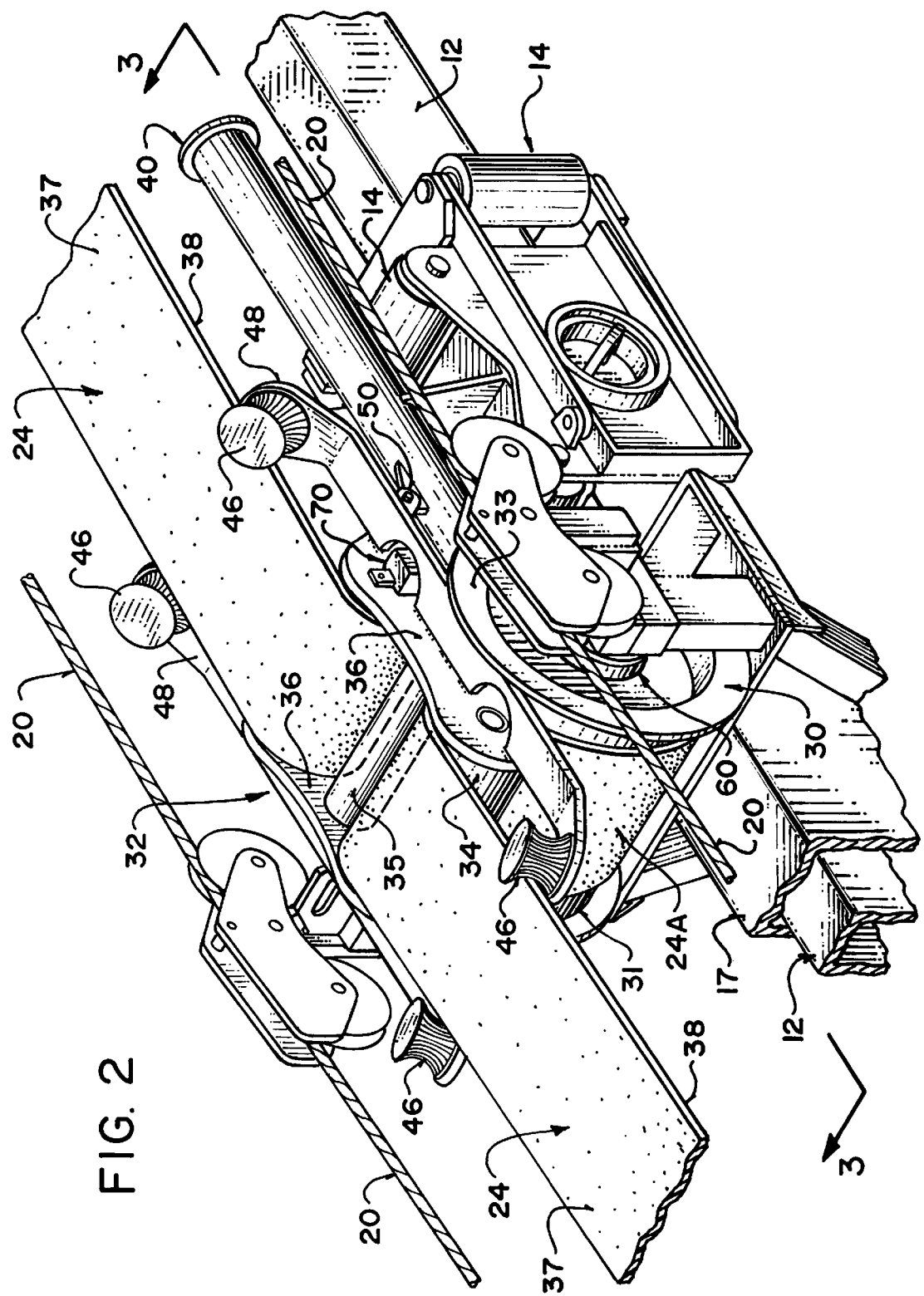
FIG. 2 is an enlarged perspective view of the belt driving portion thereof.

Additional guides are preferably provided to aid in keeping belt 24 centered. The additional guides may comprise concave rollers 46 having arcuate groves and mounted to roller assembly 32 by arms 48. Arms 48 position rollers 46 on either side of belt 24 at points ahead of and behind assembly 32. Rollers 46 are preferably mounted with their axes of rotation inclined toward drum 30 at an angle of about 45° as shown in FIGS. 2 and 3.

Roller assembly 32 should be connected to machine 10 in a way which prevents assembly 32 from rotating excessively relative to axis of rotation 29 of drum 30. In a preferred embodiment, roller assembly 32 is connected to machine 10 by a link arm 50 which is pivotally mounted to both bracket plates 36 of assembly 32 and is pivotally attached to superstructure 16. Link arm 50 preferably comprises a suitably reinforced V-shaped member having one arm pivotally attached to each bracket plate 36 and a central portion pivotally connected to frame 17 below and between bracket plates 36. In the alternative, or in addition to link arm 50, assembly 32 may also be connected to superstructure 16 by a sliding coupling (not shown) which prevents assembly 32 from tilting but allows assembly 32 to float slightly vertically atop drum 30.

Drum 30 can be rotated in a controlled manner about axis 29 by any suitable drive means, such as a hydraulic motor 60. In a preferred embodiment drum 30 is driven by a pair of rotating case hydraulic motors 60 mounted inside drum 30. Rotating drum 30 about axis 30A pulls on belt 24 and causes boom 12 to be either extended or retracted depending upon the direction of rotation of drum 30. The portion of belt 24 which forms loop 24A travels along belt 24 as boom 12 is extended or retracted.

Boom stops 40 and bumpers 41 are provided to prevent boom 12 from being driven past its designed limits of travel and to cushion shocks which result from boom 12 reaching forward or rearward limits of its travel. Limit switches may also be provided to prevent an operator from driving boom 12 past the end of its travel in either direction.

Idler rollers 34 rotate without slipping on belt 24. Consequently, a rotation sensor 70 on one of idler rollers 34 can be used to monitor the position of boom 12. Such a rotation sensor may be used, for example, to provide an input to a system for measuring the volume of wood processed by machine 10.

It can immediately be appreciated that many variations in the preferred embodiment of the invention which has been described above are possible without departing from the broad scope of the invention. For example, while it is practical for boom 12 to be stayed by one or more cables 20, the drive means of the invention could be used in association with a boom of a type which does not have cable stays. In some applications, belt 24 may be operated under sufficient tension to provide support for boom 12 without separate cable stays. Drum 30 may be turned by any suitable means, such as, without limitation, a hydraulic motor, an electric motor, a power take-off from an engine or any other suitable means. The precise means of attachment of the end of belt 24 to boom 12 may be varied in many known ways. While it is convenient to tension belt 24 with a hydraulic cylinder at its forward end, the tensioning means could be at a rearward end of belt 24 and could comprise a spring assembly in the alternative to piston 28. In some cases it may be preferable to attach the ends of belt 24 to boom 12 at two or more points so that belt 24 is prevented from twisting about is longitudinal axis. One or more strong springs could be used to tension belt 24 in place of hydraulic cylinder 28. Rollers 34 are referred to herein as "idler rollers," however, one or both of rollers 34 could be driven without departing from the broad scope of the invention. The invention has been illustrated with reference to a tree delimber but could be applied to other types of equipment equipped with an extendible boom.

It can readily be appreciated to those skilled in the art that this invention has some advantages over conventional cable driven booms. Advantages of the invention can include the following:

(a) belt 24 does not tend to twist when it is placed under tension as does a cable;

(b) belts suitable for use as belt 24 which are much stronger in tension than most commonly available cables are readily available;

(c) the pull on belt 24 is always directed parallel to the length of boom 12 (In currently used cable driven systems a length of cable from each end of boom 12 wraps several times around a grooved drum in the position of drum 30. As the cable winds on and off of the grooved drum the point at which the cable leaves the grooved drum moves laterally away from the center line of the drum and the pull of the cable is no longer directed parallel to the length of the boom. This can make it more likely that the boom will bend laterally during use.);

(d) a belt drive can be much quieter than an equivalent cable drive system;

(e) a drum for a cable driven boom typically has grooves to guide the cables and is much more expensive to make than a flat drum which can be used in the apparatus according to this invention;

(f) a belt drive, as described, has the unexpected advantage that the belt absorbs shocks that would otherwise be transmitted to the main body of machine 10 through a conventional cable drive system; and, (g) belts are more resistant to weathering than are cables which can corrode if not properly maintained.

The drive means of this invention can be relatively easily retrofitted to a machine having a standard cable driven boom by simply replacing the grooved drum used in a cable drive system with a suitable drum 30, replacing the cables with a tensioned belt 24 and adding an assembly 32 comprising a pair of spaced apart idler rollers 34.

Figure 7:
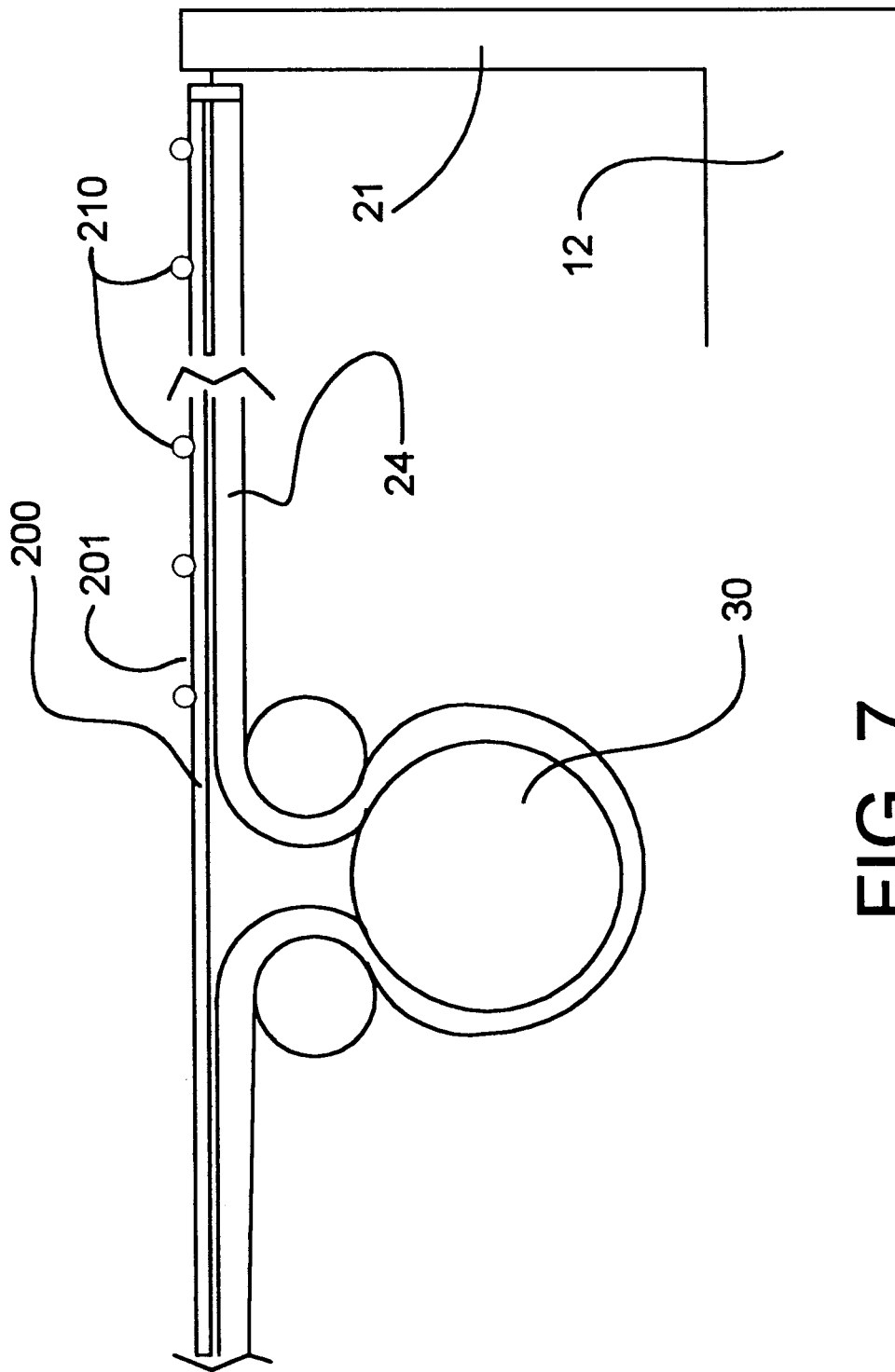

In the alternative embodiment of the invention shown in FIG. 7, a thin sheet 200 is stretched between front cable support 21 and rear cable support 22 immediately on top of belt 24. Sheet 200 has a slippery top surface 201. Top surface 201 may, for example, be coated with TEFLON™. Sheet 200 protects upper face 37 of belt 24. Sheet 200 also provides a low friction surface for hydraulic hoses 210 to slide along. Hydraulic hoses 210 zig zag between hangers (not shown) which are slidably mounted to cables 20. The weight of hoses 210 is supported by belt 24.

Hydraulic hoses 210 may carry hydraulic fluid from superstructure 16 along boom 12 to power the operation of delimbing head 23. Thus, it can be appreciated that the apparatus of the invention can provide a route for hoses 210 as an alternative to the hose routing options available on prior art systems. Hoses 210 are kept out of the way on top of belt 24 and do not hang down to locations where they can be easily snagged by a machine operator who is not careful as do hoses in some prior art systems.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An extendible boom assembly comprising:
   (a) an elongated boom member slidably connected to a frame;
   (b) a flat belt extending along the boom member the belt having first and second ends fixed to the boom member; and,
   (c) drive means on the frame and frictionally engaging the belt wherein operating the drive means to move the belt in a first direction extends the boom member and operating the drive means to move the belt in a second direction opposite to the first direction retracts the boom member.

2. The boom assembly of claim 1 wherein the drive means comprises a rotatable drive drum and means for rotating the drive drum about an axis of the drive drum wherein the belt frictionally contacts the drive drum in a contact area extending around a generally cylindrical outer surface of the drive drum.

3. The boom assembly of claim 2 wherein the contact patch extends through an angle in excess of 180 degrees relative to the axis of the drive drum.

4. The boom assembly of claim 1 wherein the drive means comprises a drive drum mounted for rotation about an axis, a motor for rotating the drive drum about the axis and at least one roller located to compress the belt against an outer surface of the drive drum.

5. The boom assembly of claim 1 wherein the drive means comprises a roller assembly comprising a pair of spaced apart rollers, a drive drum and a motor for rotating the drive drum wherein a loop of the belt extends between the rollers and frictionally engages an outer surface of the drive drum.

6. The boom assembly of claim 5 wherein the spaced apart rollers are located above the drive drum.

7. The boom assembly of claim 5 wherein an axis of rotation of the drive drum is horizontal.

8. The boom assembly of claim 7 wherein the belt comprises a rubberized drum contacting face in contact with the drive drum and a low friction roller contacting face in contact with the spaced apart rollers.

9. An extendible boom assembly comprising:
   (a) an elongated boom member slidably connected to a frame;
   (b) a flat belt extending along the boom member and connected to the boom member at either end; and,
   (c) drive means on the frame and frictionally engaging the belt the drive means comprising a roller assembly comprising a pair of spaced apart rollers located above a drive drum and a motor for rotating the drive drum wherein a loop of the belt extends between the rollers and frictionally engages an outer surface of the drive drum;
wherein operating the drive means to move the belt in a first direction extends the boom member and operating the drive means to move the belt in a second direction opposite to the first direction retracts the boom member; and,
wherein: the roller assembly comprises a pair of bracket members; the spaced apart rollers extend between left and right bracket members; and the boom assembly comprises a link arm extending between the frame to the roller assembly.

10. The boom assembly of claim 9 wherein the link arm comprises a member connected to each of the left and right bracket members and connected to the frame at a point below and between the left and right bracket members.

11. An extendible boom assembly comprising:
   (a) an elongated boom member slidably connected to a frame;
   (b) a flat belt extending along the boom member and connected to the boom member at either end;
   (c) drive means on the frame and frictionally engaging the belt, the drive means comprising a roller assembly comprising a pair of spaced apart rollers, a drive drum and a motor for rotating the drive drum; and,
   (d) a rotation sensor on a first one of the spaced apart rollers, the rotation sensor producing an output signal in response to rotation of the first one of the spaced apart rollers;
wherein a loop of the belt extends between the rollers and frictionally engages an outer surface of the drive drum wherein operating the drive means to move the belt in a first direction extends the boom member and operating the drive means to move the belt in a second direction opposite to the first direction retracts the boom member.

12. A drive system for extending and retracting a boom, the boom comprising an elongated boom slidably mounted to a vehicle superstructure, the drive system comprising:
   (a) a flat belt extending generally parallel to the boom, the belt having first and second ends coupled to the boom;
   (b) a rotatable drum mounted to the vehicle superstructure;
   (c) a pair of spaced apart rollers adjacent the rotatable drum;
wherein a loop of the belt extends through a gap between the pair of spaced apart rollers and around an outer circumference of the rotatable drum and the gap has a width less than a diameter of the rotatable drum.

13. The drive system of claim 12 wherein the pair of spaced apart rollers are supported by the belt.

14. The drive system of claim 12 wherein the boom comprises upwardly extending members at either end thereof and a tensioned cable extending between the upwardly extending members.

15. The drive system of claim 12 wherein one end of the belt is coupled to the boom by a coupling comprising a transverse member mounted for rotation to the boom, connecting means for connecting a first end of the belt to the transverse member, means for rotating the transverse member in a first sense, and locking means engageable to prevent the transverse member from rotating in a sense opposite to the first sense, wherein the first end of the belt can be secured by connecting the first end of the belt to the transverse member and rotating the transverse member in the first sense to wind the belt around the transverse member.

16. The drive system of claim 15 wherein the connecting means comprises a slot penetrating through the transverse member, the slot dimensioned to receive an end portion of the belt.

17. The drive system of claim 12 wherein a second end of the belt is connected to the boom by a hydraulic cylinder.

18. The drive system of claim 17 wherein a first end of the belt is secured to a transverse member rotatably mounted to the boom and the drive system comprises a ratchet assembly on the transverse member, wherein the first end of the belt may be securely fastened to the boom by rotating the transverse member to wrap the first end of the belt around the transverse member.

19. The drive system of claim 17 wherein the hydraulic cylinder is connected to a hydraulic line which contains pressurized hydraulic fluid whenever the drive system is operational.

20. A drive system for extending and retracting a boom, the boom comprising an elongated boom slidably mounted to a vehicle superstructure, the drive system comprising:
   (a) a flat belt extending generally parallel to the boom, the belt having first and second ends coupled to the boom;
   (b) a rotatable drum mounted to the vehicle superstructure;
   (c) a pair of spaced apart rollers adjacent the rotatable drum;
wherein a loop of the belt extends through a gap between the pair of spaced apart rollers and around an outer circumference of the rotatable drum and the gap has a width less than a diameter of the rotatable drum wherein one end of the belt is coupled to the boom by a coupling comprising a rigid spreader attached to the one end of the belt.

21. The drive system of claim 20 wherein the coupling comprises a spring connected between the spreader bar and the boom to tension the belt.

22. The drive system of claim 20 wherein the coupling comprises a hydraulic cylinder connected between the spreader and the boom wherein the hydraulic cylinder is connectable to a source of a pressurized hydraulic fluid to tension the belt.

23. a tree delimber comprising:
(a) an undercarriage;
(b) a superstructure mounted to the undercarriage;
(c) a boom slidably mounted to the superstructure;
(d) a drive means for the boom, the drive means comprising:
  (i) a flat belt extending generally parallel to the boom, the belt attached to the boom by couplings at either end thereof;
  (ii) a drum mounted to the superstructure and rotatable about an axis by a reversible drive; and,
  (iii) a roller assembly comprising a pair of spaced apart rollers adjacent the drum;
  wherein a loop of the belt extends through a gap between the pair of spaced apart rollers and around an outer surface of the rotatable drum;
(e) a pair of delimbing knives mounted at a forward end of the boom; and
(f) tree holding means mounted to the superstructure for holding a tree while the delimbing knives are moved along the tree by the drive means.

24. The tree delimber of claim 23 wherein the roller assembly is free to float at least slightly vertically with respect to the drum.

25. The tree delimber of claim 24 wherein the drive means comprises a link arm connecting the roller assembly to the superstructure.

26. The tree delimber of claim 24 comprising a rotation sensor on one of the spaced apart rollers, an output from the rotation sensor connected to apparatus for measuring a quantity of wood processed by the tree delimber.

27. The tree delimber of claim 24 comprising a sheet of material supported above the belt, the material having a low friction upper surface, and a hydraulic hose extending from the superstructure to the forward end of the boom, the hydraulic hose at least partially supported on the upper surface of the sheet of material.

* * * * *